United States Patent [19]

Horiki et al.

[11] Patent Number: 4,940,624
[45] Date of Patent: Jul. 10, 1990

[54] MASKING MEMBER

[76] Inventors: Seinosuke Horiki; Reiji Makino, both of 213-5 Honowari, Minamishibata-cho, Tokai-shi, Aichi, Japan

[21] Appl. No.: 431,563

[22] Filed: Nov. 3, 1989

[30] Foreign Application Priority Data

Nov. 4, 1988 [JP] Japan .................... 63-144545[U]

[51] Int. Cl.⁵ .................. B32B 1/00; B32B 3/10; B32B 3/30
[52] U.S. Cl. .................................. 428/159; 428/36.5; 428/131; 428/137; 428/138; 428/167; 428/172; 428/319.7
[58] Field of Search ............. 428/36.5, 131, 137, 428/138, 159, 160, 167, 172, 319.7

[56] References Cited

FOREIGN PATENT DOCUMENTS 1361501 7/1974 United Kingdom ................ 428/159

Primary Examiner—William J. Van Balen

[57] ABSTRACT

A masking member consisting of an elastic sheet having a groove(s) for bending in a selected position(s) on one or both sides of said sheet is provided in the present invention. Said masking member is used to protect a pillar, frame, and the like from a surface treatment such as coating.

6 Claims, 4 Drawing Sheets

MASKING MEMBER

BACKGROUND OF THE INVENTION

The present invention relates to a masking member which protects a part of an article from a surface treatment such as coating, plating, vacuum evaporation, phosphatizing, and the like. More particularly, the present invention relates to a masking member consisting of an elastic sheet having a groove(s) for bending in a selected position(s) on one or both sides of said sheet. When a surface treatment is effected on the surface of an article, and if said surface of said article has a part(s) on which said surface treatment should not be effected for the reason that another surface treatment is effected on said part(s) after said surface treatment or said surface treatment spoils the appearance of said article and so on, said part(s) of said surface of said article may be covered and protected with said masking member.

DESCRIPTION OF THE PRIOR ART

Hitherto, adhesive tape has been used as a masking member to protect a pillar, frame, and the like. Namely, the adhesive tape is wound round said pillar, frame, and the like to protect them from said surface treatment and after said surface treatment, said adhesive tape is removed from said pillar, frame, and the like. Said pillar, frame, and the like may be not effected by said surface treatment since said pillar, frame, and the like was covered with said adhesive tape during said surface treatment.

Nevertheless, adhesive tape as a masking member has faults in that attaching and removing of the adhesive tape to/from a pillar, frame, and the like take time and have a high labor cost, and further, the adhesive tape wound round a pillar, frame, and the like is buried in the layer of said surface treatment and it is very difficult to find the outer end of said buried adhesive tape to remove said adhesive tape. Said faults of adhesive tape may seriously obstruct a mass-production line such as a coating line for automobiles.

SUMMARY OF THE INVENTION

Accordingly, an object of the present invention is to save trouble when the masking member is attached/removed to/from a part to be protected such as a pillar, frame, and the like. According to the present invention, there is provided a masking member consisting of an elastic sheet having groove(s) for bending in selected position(s) on one or both sides of said sheet. Said masking member may be attached on a pillar, frame, and the like by bending said masking member along said groove(s) to surround said pillar, frame, and the like.

BRIEF DESCRIPTION OF THE DRAWINGS

FIG. 1 is a cross sectional view of the masking member.

FIG. 2 is a partial perspective view of both ends of the masking member.

FIG. 3 is a cross sectional view showing that the masking member is attached on a pillar.

FIG. 4A is a partial front view of the said pillar after coating.

FIG. 4B is a partial front view of the said pillar after the masking member has been removed.

FIG. 6 is a cross sectional view of the masking member.

FIG. 7 is a plane view of the masking member.

FIG. 8 is a cross sectional view showing that the masking member is attached on a pillar.

DETAILED DESCRIPTION

Figure 1:
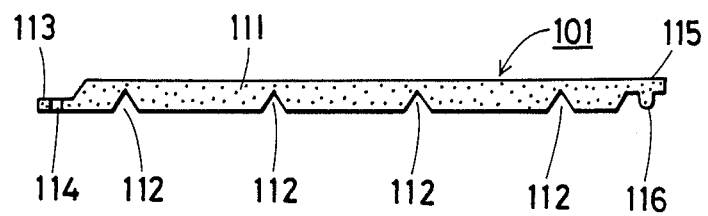
FIG. 1 to FIG. 4 relate to a first embodiment of the present invention.
Figure 2:
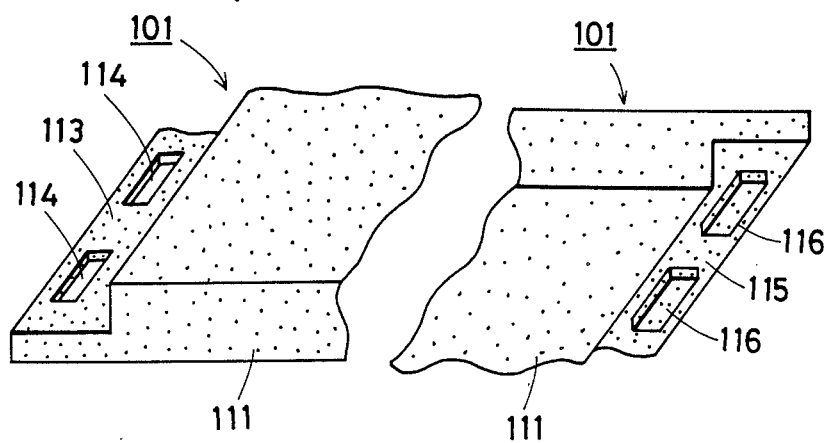

FIG. 1 to FIG. 4 relate to a first embodiment of the present invention. Referring now to FIG. 1 to FIG. 6, a masking member (101) consists of an elastic sheet (111) made of polystyrene foam and having four parallel grooves (112) which are formed on a side of said sheet (111) at regular intervals. A flange part (113) is extended from one end of one side of said sheet (111) and further, a flange part (115) is extended from the other end of the other side of said sheet (111). Two holes (114) are formed in said flange part (113) while two projections (116) are formed on said flange part (115).

Figure 3:
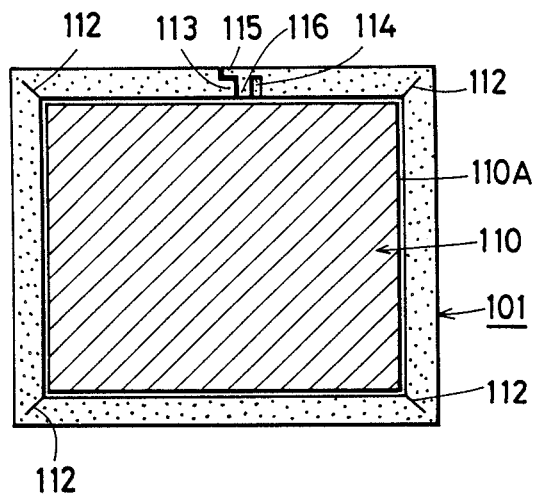
Figure 4:
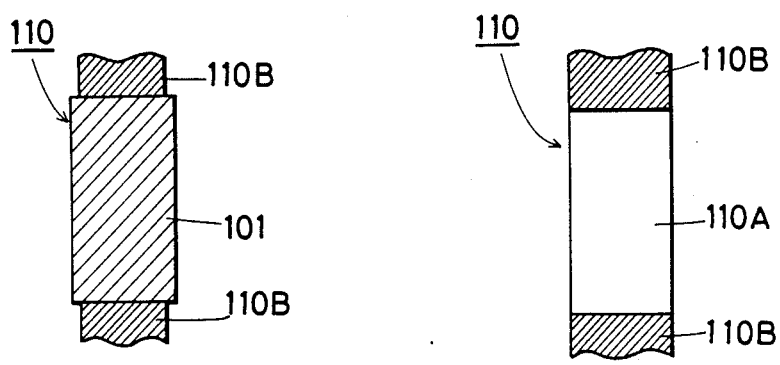

Said masking member (101) is attached on a part (110A) of a pillar (110) of a door of an automobile by bending said masking member (101) along said groove (112) to surround said part (110A) of said pillar (110) and said two projections (116) of said flange part (115) are respectively engaged in said holes (114) of said flange part (113) to secure said masking member (101) on the circumference of said part (110A) of said pillar (110) as shown in FIG. 3.

After said masking member (101) has been attached on said part (110A) of said pillar (110) as above described, said pillar (110) is coated by spraying a paint (110B) as shown in FIG. 4A and said part (110A) of said pillar (110) which is covered with said masking member (101) is not coated with said paint (110B). After coating, said masking member (101) is removed from said part (110A) of said pillar (110) by hand, hook, and the like and said pillar (110) has said part (110A) which is not coated with said paint (110B) as shown in FIG. 4B.

Figure 5:
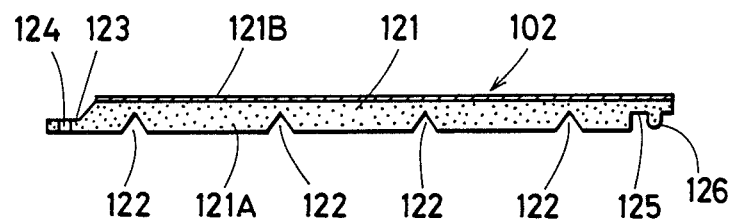
FIG. 5 is a cross sectional view of the masking member of a second embodiment of the present invention.

FIG. 5 relates to a second embodiment of the present invention. Referring now to FIG. 5, a masking member (102) consists of an elastic sheet (121) made of a laminated sheet (121) of a polystyrene foam sheet (121A) and a polypropylene film (121B) and having four parallel grooves (112) which are formed on said polystyrene sheet (121A) side of said laminated sheet (121) at regular intervals. A flange part (123) is extended from one end of one side of said sheet (121) and further, a flange part (125) is extended from the other end of the other side of said sheet (121). Two holes (124) are formed in said flange part (123) while two projections (126) are formed on said flange part (125).

Said masking member (102) is attached on a pillar, frame, and the like the same as in the first embodiment. In this next embodiment, said masking member (102) may have a higher solvent resistance and a higher heat resistance than the masking member (101) of the first embodiment since said polypropylene film (121B) protects and reinforces said polystyrene foam sheet (121A) so that said masking member (102) can be reused.

Figure 6:
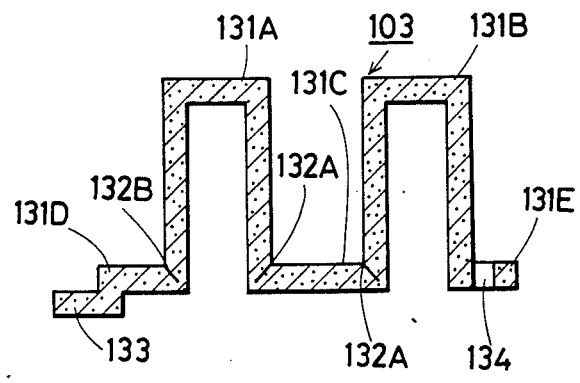
FIG. 6 to FIG. 8 relate to a third embodiment of the present invention.
Figure 7:
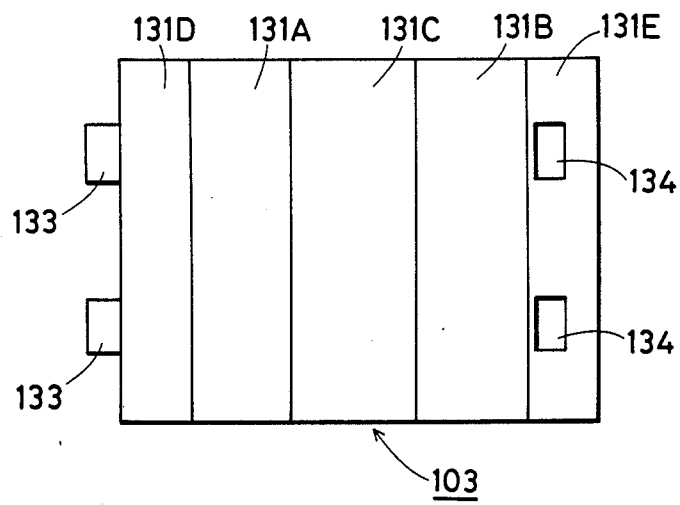
Figure 8:
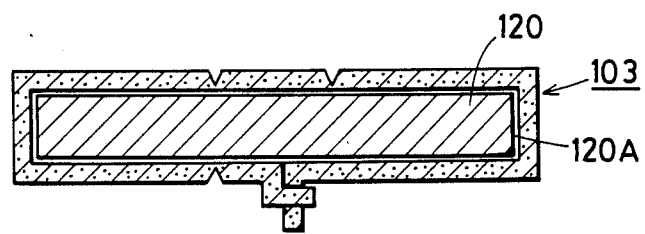

FIG. 6 to FIG. 8 relate to a third embodiment of the present invention. Referring now to FIG. 6 to FIG. 8, a masking member (103) consists of a molded elastic sheet (131) made of polypropylene in which 30% by weight of calcium carbonate is mixed. Said masking member (103) comprises a pair of hill parts (131A) and (131B), a connecting part (131C) between said hill parts (131A) and (131B), and a pair of flange parts extending respectively from the outer ends of said hill parts (131A) and (131B), and two insert parts (133) are extended from the outer end of said flange part (131D) while two holes (134) are formed in said flange part (131E). Two grooves (132A) are formed between said hill parts (131A), (131B) and said connecting part (131C) and further a groove (132B) is formed between said hill part (131A) and said flange (131D). Said masking member (103) may be produced by vacuum forming, press, extrusion, injection molding, and the like. Said masking member (103) is attached on a part (120A) of a pillar (120) to be protected from a coating by bending said masking member (103) along said grooves (132A), and (132B), to surround said part (120A) of said pillar (120) and said two insert parts (133) of said flange (131D) are respectively inserted into said holes (134) of said flange (131E) to secure said masking member (103) on said part (120A) of said pillar (120) as shown in FIG. 8. Said masking member (103) has an excellent solvent resistance and an excellent heat resistance since said masking member (103) is made of polypropylene in which calcium carbonate is mixed so that said masking member (103) can be reused.

The masking member of the present invention is made of an elastic sheet such as from plastics such as polystyrene, polyethylene, polypropylene, polyvinylchloride, polyurethane, melamine resin, urea resin and the like; plastic foams of said plastics; laminated sheet of said plastic foams and said plastics; fiber sheet such as fabric, knitting, non-woven fabric, paper, corrugated card board and the like; thermoplastic resin—impregnated fiber sheet; thermo-setting resin—impregnated fiber sheet; wooden sheet such as wood board, hardboard, plywood and the like; metal sheet and the like.

In cases where said masking member is made of plastics, it is desirable to mix inorganic filler such as calcium carbonate, talc, bentonite, stone powder, blast furnace slag, flyash, and the like into said plastics since heat resistance, mechanical properties and the like of said masking member are improved by said inorganic filler and further, when used masking member is burnt in a combustion furnace, a smaller combustion energy is produced so that said combustion furnace will stand long use. Usually, 10 to 500 weight parts, desirably 20 to 400 weight part of said inorganic filler are mixed into said plastics. Polyolefin such as polyethylene, polypropylene and the like is desirable plastics for the material of the masking member of the present invention since said polyolefin has high solvent resistance and is inexpensive, and of course, polyolefin in which said inorganic filler is mixed is a desirable material for said masking member. Polystyrene foam is also a desirable material for said masking member since said polystyrene foam is light and inexpensive, nevertheless, since said polystyrene foam has a low solvent resistance and a low heat resistance, it is desirable to laminate a suitable plastic onto said polystyrene foam.

We claim:

1. A masking member consisting of an elastic sheet having a groove(s) for bending in a selected position(s) on one or both sides of said sheet.

2. A masking member in accordance with claim 1, wherein said elastic sheet is a laminated sheet consisting of a polystyrene foam sheet and a thermoplastic sheet, and said groove(s) is(are) formed on said polystyrene foam sheet side.

3. A masking member in accordance with claim 1, wherein said elastic sheet is a thermoplastic sheet.

4. A masking member in accordance with claim 3, wherein an inorganic filler is mixed into said thermoplastic sheet.

5. A masking member in accordance with claim 1, wherein said elastic sheet is a fiber sheet.

6. A masking member in accordance with claim 1, wherein a thermoplastic resin and or a thermo-setting resin is impregnated into said fiber sheet.

* * * * *